A. E. COOK.
MOWING ATTACHMENT FOR AUTOMOBILES.
APPLICATION FILED NOV. 20, 1916.
1,372,339.
Patented Mar. 22, 1921.
5 SHEETS—SHEET 4.
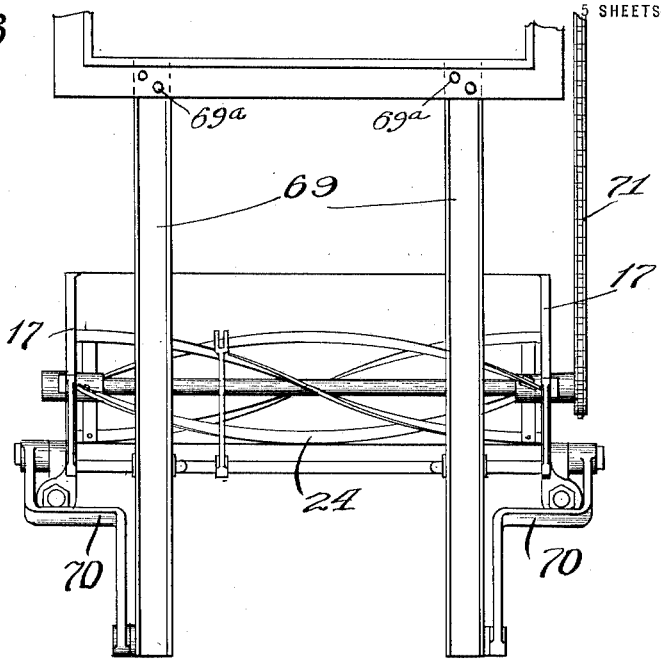
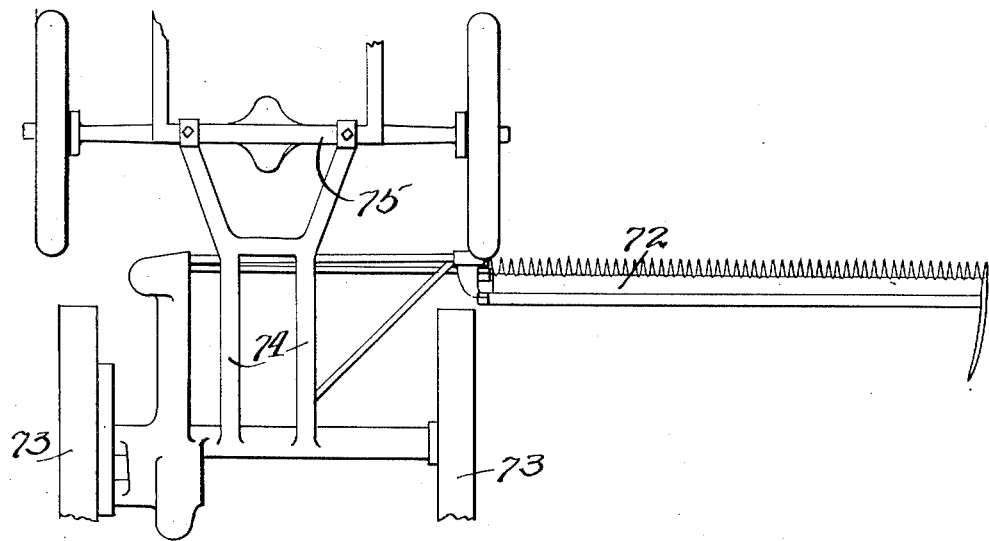

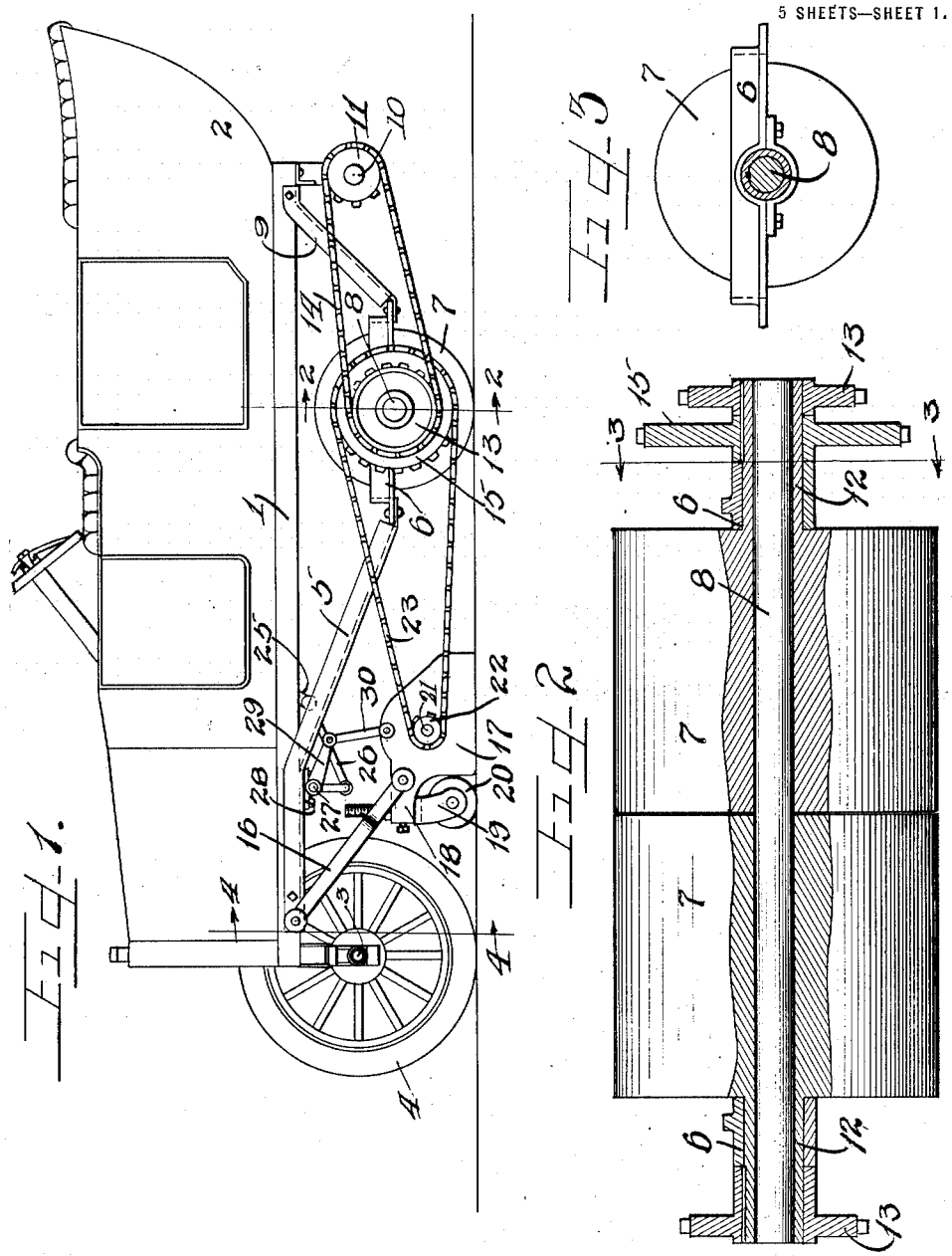

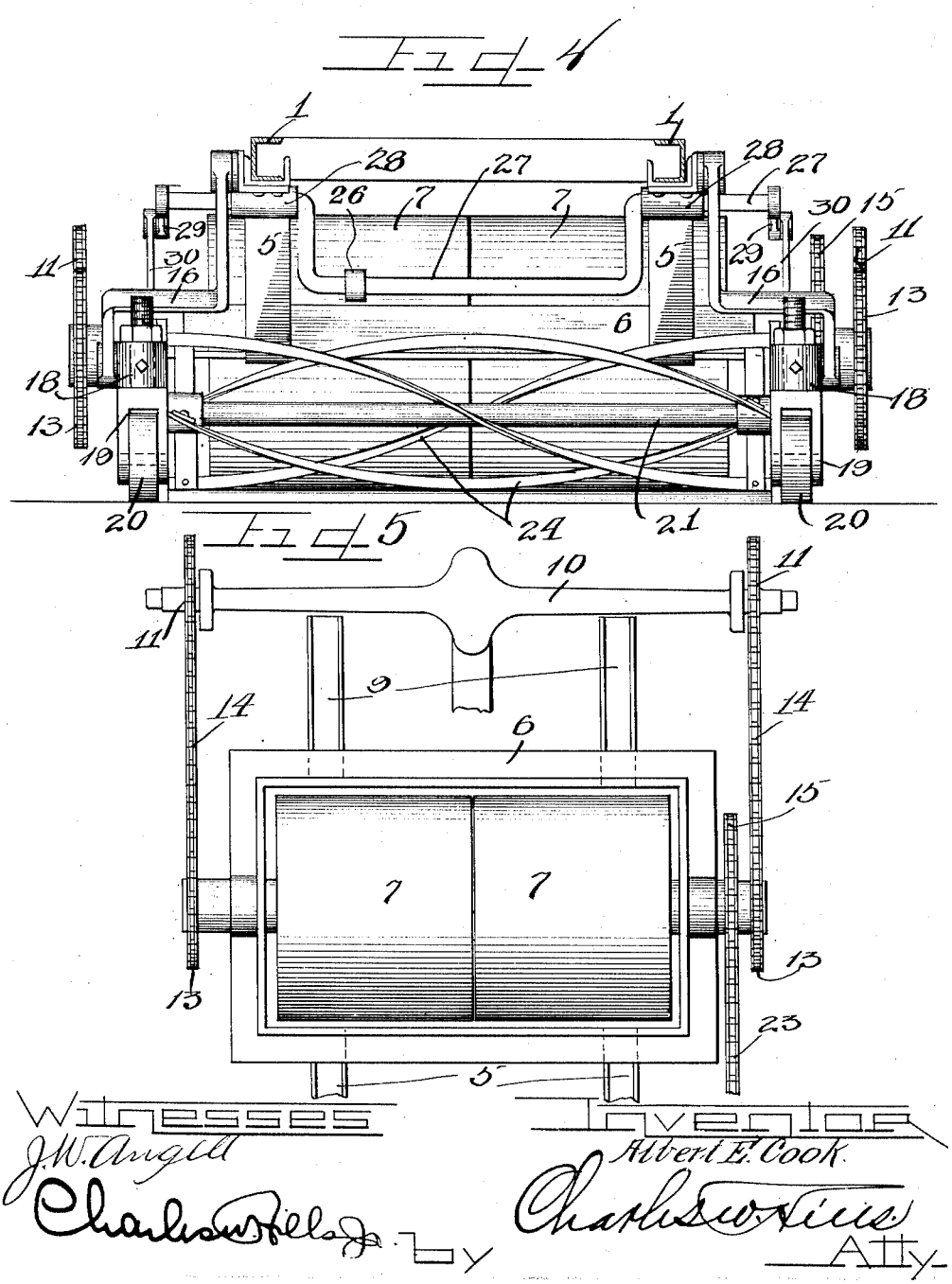

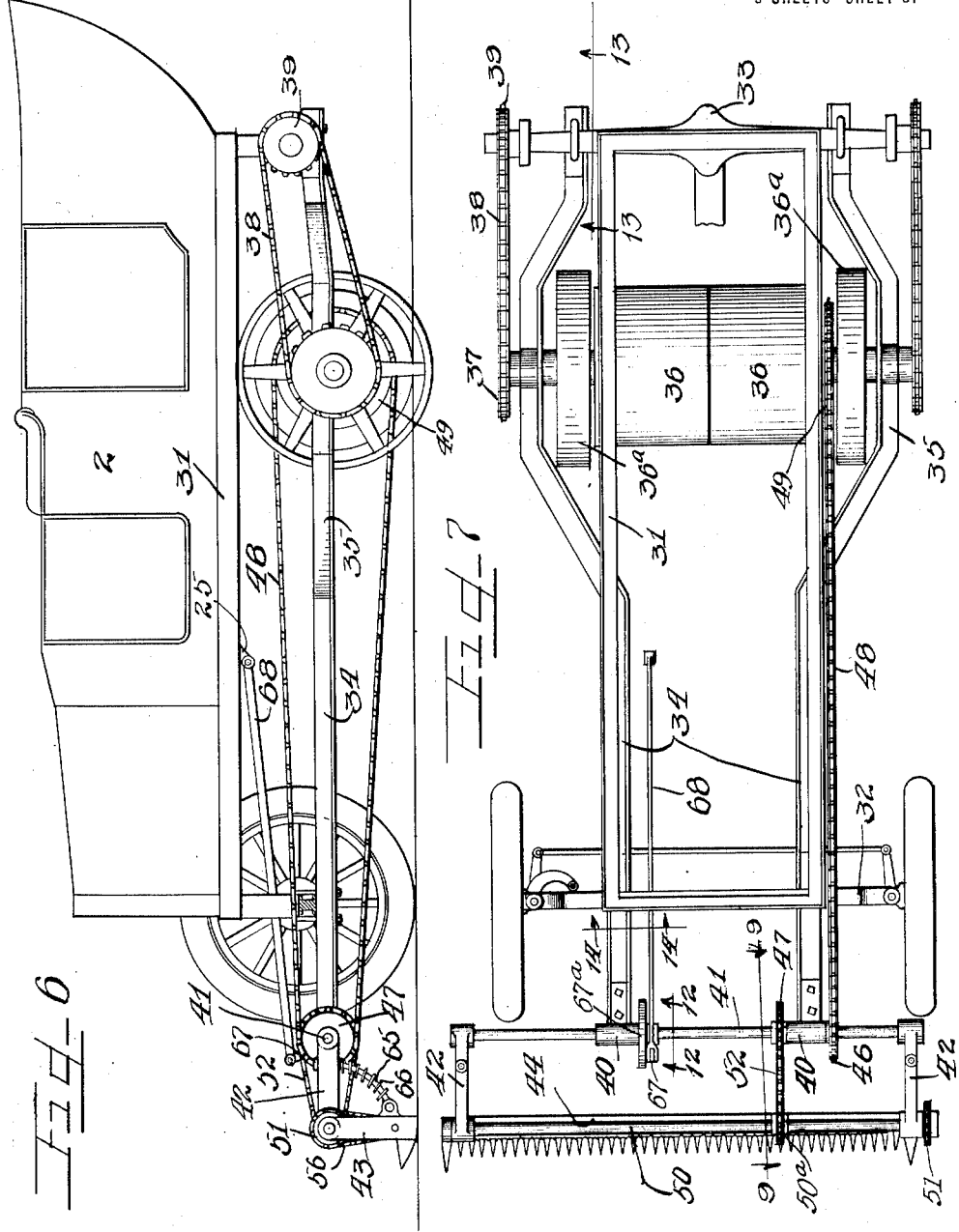

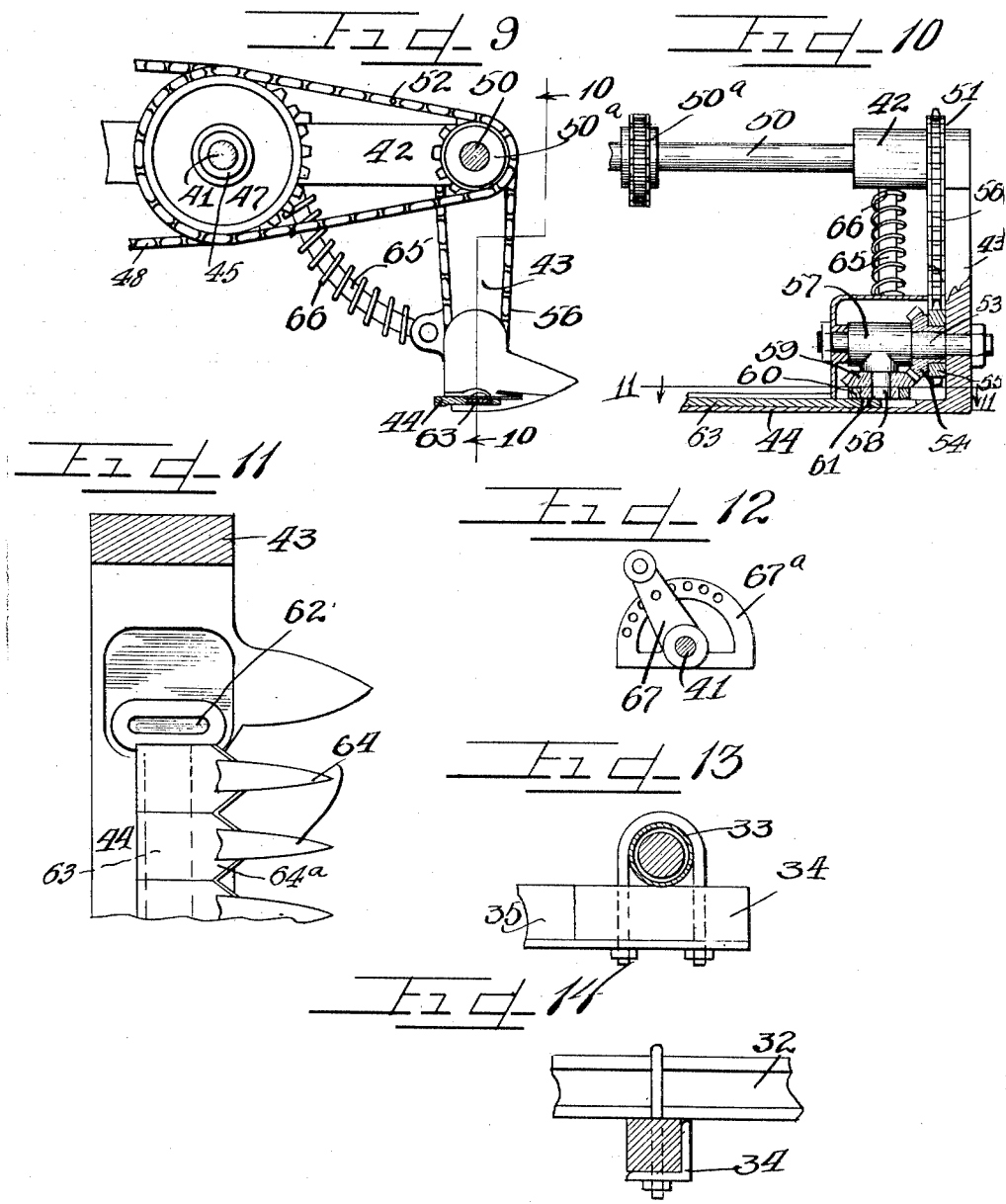

UNITED STATES PATENT OFFICE.

ALBERT E. COOK, OF CHICAGO, ILLINOIS.

MOWING ATTACHMENT FOR AUTOMOBILES.

1,372,339.  Specification of Letters Patent.  Patented Mar. 22, 1921.

Application filed November 20, 1916. Serial No. 132,464.

*To all whom it may concern:*

Be it known that I, ALBERT E. COOK, a citizen of the United States, and a resident of the city of Chicago, in the county of Cook and State of Illinois, have invented certain new and useful Improvements in Mowing Attachments for Automobiles; and I do hereby declare that the following is a full, clear, and exact description of the same, reference being had to the accompanying drawings, and to the numerals of reference marked thereon, which form a part of this specification.

This invention relates to a lawn mowing and rolling attachment capable of association with a motor vehicle, and not requiring reconstruction of the motor vehicle other than to provide means of attachment of the mowing and rolling sub-frame to the chassis of the vehicle.

It is an object therefore of this invention to construct a grass cutting and rolling mechanism which can be readily connected upon a motor car partially sustaining the weight thereof, and driven from the rear axle structure of the motor car from which the rear wheels have been removed and replaced by sprockets.

It is also an object of this invention to construct a mowing attachment for connection upon a motor car to receive the drive from the axle of the motor car, with the mowing attachment partially supporting the car as well as propelling the same together with said attachment over the ground.

It is also an object of this invention to construct a mowing attachment for connection upon a motor car embodying a structural frame adapted to be connected to the chassis of the motor car and carrying the operating mechanisms of the attachment, which are driven from the axle of the motor car, from which the wheels have been detached so that the motor car is partially supported upon the mowing attachment and upon the usual front wheels of the motor car whereby the entire associated mechanisms may be steered.

It is furthermore an important object of this invention to construct a mowing or grass cutting attachment for connection to an ordinary stock type of motor car by bolting the frame of the attachment to the chassis of the motor car and adapting driving sprockets to the rear axle sections of the motor car in place of the usual wheels provided so that the motor car is partially supported upon the attachment and driven therewith over the ground and operated in the usual manner from the driver's seat of the car.

It is finally an object of this invention to construct a simple and efficient type of mowing attachment for connection to a standard type of motor car utilizing the front wheels of the motor car for steering the connected attachment and motor car, and with the rear portion of the motor car supported upon the attachment and connected through the rear axle of the motor car to drive the same.

The invention (in a preferred form) is illustrated in the drawings and hereinafter more fully described.

On the drawings:

Figure 1, is a side elevation of an attachment embodying the principles of my invention connected upon a motor car.

Fig. 2, is a fragmentary detail section taken on line 2—2, of Fig. 1.

Fig. 3, is a sectional view taken on line 3—3, of Fig. 2.

Fig. 4, is a sectional view with parts omitted taken on line 4—4, of Fig. 1.

Fig. 5, is a fragmentary bottom plan view of a portion of the mowing attachment mechanism at the rear of the vehicle.

Fig. 6, is a view similar to Fig. 1, of a modified form of attachment.

Fig. 7, is a top plan view thereof with the body of the motor vehicle removed from its chassis and other parts omitted.

Fig. 8 illustrates a modified form of device showing a rotary grass cutter attached to the front end of a motor vehicle.

Fig. 9, is a detail section taken on line 9—9, of Fig. 7, with parts omitted.

Fig. 10, is a fragmentary detail section taken on line 10—10, of Fig. 9.

Fig. 11, is an enlarged detail section taken on line 11—11, of Fig. 10.

Fig. 12, is a detail section taken on line 12—12, of Fig. 7.

Fig. 13, is a detail section taken on line 13—13, of Fig. 7.

Fig. 14, is a detail section taken on line 14—14, of Fig. 7.

Fig. 15, is a fragmentary top plan view of another form of attachment for a motor vehicle.

As shown in the drawings:

The side sills of the chassis of the motor car shown in Fig. 1, are denoted by the reference numeral 1, and the motor car body 2, is shown mounted thereon in a usual manner. The front axle 3, of the motor car is supported and connected to the chassis in the usual manner, and has journaled on the outer ends thereof steering wheels 4. Attached to the chassis of the motor car is a sub-frame comprising forward members 5, bolted beneath the forward ends of the chassis sills 1, and extending rearwardly and bent downwardly and at their rear ends secured to a rectangular frame 6, in which a pair of rollers 7, are journaled upon an axle 8. Secured to the rear side of the roller frame 6, are frame members 9, which lead upwardly and are secured to the rear ends of the chassis sills, of the motor car. The rear axle of the motor car, denoted as a whole by the reference numeral 10, is mounted as usual at the rear of the chassis, and sprocket-wheels 11, are connected to the outer ends of the axle sections in place of the usual vehicle wheels provided. The rear axle of the motor car is adapted to be driven from the motor of the vehicle in the usual manner the details of connections being omitted since they form no part of the present invention. The outer ends of each of the rollers 7, are provided with a tubular axle extension 12, and keyed on each thereof are sprocket wheels 13, around which chains 14, are trained and which are also trained around the respective sprocket wheels 11, on the motor vehicle axle so that said respective rollers 7, are driven differentially. Mounted adjacent one of the sprocket wheels 13, and also keyed upon the tubular axle extension 12, of one of the rollers 7, is a relatively large sprocket wheel 15, the purpose of which is to drive the rotary cutting knives of a mowing attachment hereinafter described.

Pivotally connected upon the forward end of the sub-frame members 5, as clearly shown in Figs. 1 and 4, are arms 16, which are bent outwardly and pivotally connected to side frame members 17, of a mowing attachment. Vertical bearing members 18, are formed at the forward end of the frame members 17, and rotatably mounted therein are yoke members 19, in which relatively large caster wheels 20, are journaled. Journaled transversely between the side frame members 17, is a shaft 21, one end of which is extended and is provided with a sprocket wheel 22, around which a sprocket chain 23, is trained, and also about the large sprocket wheel 15, associated with one of the rollers 7. Secured upon said shaft 21, as clearly shown in Fig. 4, are a series of helical cutting knives 24, which rotate as said shaft 21, is driven.

Means are provided for elevating the mowing mechanism contained within the side frames 17, out of contact with the ground, from the driver's position in the motor car. For this purpose, connected to the usual brake pedal of the motor car, the lower end 25, only of which is visible in Fig. 1, is a link 26, which is in turn connected to a shaft 27, journaled transversely of the chassis sills 1, in bearing brackets 28, secured beneath the respective frame members 5. Secured upon the outer ends of the transverse shaft 27, are crank arms 29, which are connected by means of links 30, pivoted to the upper end of the side frame members 17, of the mowing attachment.

In the modified form of device illustrated in Figs. 6, 7 and 9 to 14, inclusive, the chassis frame of the motor car is denoted by the reference numeral 31, and secured beneath the front axle 32, and beneath the rear axle 33, in the manner shown in Figs. 13 and 14, is a sub-frame comprising side members 34, which, near their rear ends are bent outwardly, as denoted by the reference numeral 35, to receive an axle mounted therein on which a pair of rollers 36, and wheels 36ª, are journaled, the wheels 36ª, being of less width and of greater diameter than the roller 36. The manner in which the rollers 36, and wheels 36ª, are mounted on the axle is identical with that shown in Fig. 2, of the construction previously described. Each of the rollers 36, and its adjacent wheel 36ª, is adapted to be driven differentially with respect to the other roller and wheel by a sprocket wheel 37, having a chain 38, trained therearound and about a sprocket wheel 39, the respective sprocket wheels 39, being secured upon the outer end of the axle sections of the axle 33, of the motor car after detachment of the vehicle wheels therefrom.

Secured at the forward ends of the respective sub-frame sill members 34, are bearings 40, in which is journaled for pivotal movement a relatively long transversely extending shaft 41. Secured on the outer ends of said shaft or rod 41, are bracket arms 42, and pivotally connected thereto and depending therefrom are arms 43, integrally formed on or rigidly secured to a long transverse finger or stationary frame bar 44. Journaled on and near one end of the shaft or bar 41, is a tubular sleeve 45, which is within one of the bearings 40, and secured on one end of the sleeve 45, is a sprocket wheel 46, and on the other end thereof is a sprocket wheel 47. A sprocket chain 48, is trained about the sprocket wheel 46, and also a large sprocket wheel 49, secured upon the axle extension of one of the rollers 36, in a manner similar to the construction shown in Fig. 2, of the prior construction. Mounted at the pivotal connection between the arms 42, and arms 43, is a long shaft 50, with a sprocket wheel 50ª, secured thereon near the middle thereof, and on one end of said shaft is secured a sprocket wheel 51. Trained about the sprocket wheel 50ª, to drive the shaft 50, is a sprocket chain 52, which is also trained about the sprocket wheel 47. Secured through one of the depending arms 43, as clearly shown in Fig. 10, is a stud shaft 53, and journaled thereon is a beveled pinion 54, which has secured thereto a sprocket wheel 55, and a sprocket chain 56 is trained about said sprocket wheel 55, and about the sprocket wheel 51.

Secured upon the inner end of the stud shaft 53, is a bracket member 57, having a downwardly extending stud 58, on which another bevel pinion 59, is journaled, meshing with the bevel pinion 54. Secured on the under surface of the bevel pinion 59, is a ring 60, having a pin projection 61, extending downwardly therefrom which engages in a transverse slot 62, at the end of a toothed cutter bar 63, which is slidable longitudinally in the transverse stationary frame bar 44, a detail of which is shown in Fig. 11. The stationary frame bar 44, is provided with a plurality of forwardly projecting stationary guards 64, and the transversely oscillating toothed bar 63, is provided with knives 64ª which coact therewith to mow the grass. The depending arm 43, supporting the frame bar 44, and its cutting mechanism is permitted a rearward swinging movement against spring stress in the event of the cutting mechanism striking against an obstruction during the progress of mowing. For this purpose a curved guide bar 65, is connected at the lower end of each of the depending arms 43, and curving upwardly is slidably engaged through the respective arms 42, and coiled about each of the curved guide bars or rods 65, are compression springs 66. For the purpose of swinging the mowing attachment upwardly into a position out of use and holding the same in any one of a number of adjusted positions a crank 67, is secured upon the shaft or bar 41, and is actuatable by a long lever or rod 68, attached to the usual brake pedal 25, of the motor car. Said crank 67, is apertured near its outer end and is adapted to swing alongside of a curved bar 67ª, which is provided with a series of apertures with any one of which the aperture in the crank 67, may register to receive a pin therethrough to lock said crank from movement and hold the mowing attachment in an adjusted position.

In the modified form of device illustrated in Fig. 8, I have shown the possibility of attachment of a rotary grass cutter or mower at the front end of the chassis of the motor car by bolting thereto forwardly extending frames or sill members 69, by means of bolts 69ª. At the forward ends of the sills are pivoted downwardly depending and outwardly bent bracket arms 70, substantially identical with the arms 16, shown in Figs. 1 and 4. Said arms 70, are, as in the prior construction described and shown in Figs. 1 and 4, pivoted to side frame members 17, in which the rotary cutter 24, is mounted. A sprocket chain 71, serves to drive the cutter 24, by connection to a sprocket wheel, such as the sprocket wheel 49, shown in Fig. 6.

In the modified form of device shown in Fig. 15, I have shown a mowing attachment denoted as a whole by the reference numeral 72, mounted upon wheels 73, and connected by means of a bracket frame 74, to the rear chassis member 75, of the motor car. In this latter construction, the mowing attachment is merely towed along by the motor vehicle, and the drive is obtained due to the rotation of the supporting wheels 73. However, it is obvious that this structure may be mounted in front of the vehicle and propelled thereby as well.

The operation is as follows:

Referring first to the type of construction illustrated in Figs. 1 to 5, inclusive, the rear wheels of the motor car are detached and replaced by sprocket wheels 11, and the sub-frame 5—6—9, connected beneath the chassis sills 1, of the motor car frame, and the rear portion of the motor car is thereby supported upon the respective rollers 7, journaled in said sub-frame. The rear axle of the automobile is driven by the automobile motor in the ordinary manner the details of connection being omitted. A differential drive is imparted to the respective rollers 7, from the sprocket wheels 11, at the outer end of the motor car rear axle, and the associated motor car and mowing attachment is thereby driven along and may be guided by the front wheels 4, in the usual manner. If an obstruction is encountered by the mowing mechanism which precedes the rollers 7, the mowing mechanism will merely swing rearwardly and upwardly upon the bracket arms 16, and if it is desired to draw the mowing mechanism upwardly out of contact with the ground, the brake lever 25, is merely depressed by the operator, thereby actuating the linkage mechanism to elevate the mowing means through the links 30. The rotary cutting knives 24, of the mowing mechanism, are rotated due to the sprocket and chain connection with a sprocket wheel associated with one of the rollers 7.

In the modified form of device illustrated in Figs. 6 and 7, I have shown a sub-frame of slightly different construction wherein the rear end of the motor car is, as before, supported upon rollers having the reference numeral 36, and driven by sprockets on the ends of the axle sections of the motor car from which the rear wheels have been detached, but the mowing mechanism, which is of a different type, is mounted at the forward end of the sub-frame in front of the front wheels, instead of back of the front wheels as in the prior construction. The drive to the mowing mechanism in this modified form of device is also obtained from a sprocket wheel associated with one of the rollers 36, and the rearward swinging movement of the entire cutting mechanism of the mowing device is readily permitted owing to the co-axial arrangement of the driving sprocket and chain with reference to the pivotal center of movement of said cutting mechanism.

In the modified form of device shown in Fig. 8, a mowing mechanism similar to that shown in Fig. 1, is shown mounted at the forward end of the chassis in front of the front wheels.

In the modified form of device illustrated in Fig. 15, the mowing mechanism denoted as a whole by the reference numeral 72, is towed behind the motor vehicle by attachment of the frame 74, of the device, to the rear axle 75, of the motor car.

I am aware that various details of construction may be varied through a wide range without departing from the principles of this invention, and I therefore do not purpose limiting the patent granted otherwise than necessitated by the prior art.

I claim as my invention:

1. The combination with a motor car, of a mowing and roller attachment disposed beneath said car and between the front and rear axles thereof, and means for driving said attachment from the rear axle of the motor car.

2. The combination with a motor car, of a roller mechanism mounted beneath the car between the front and rear axles thereof, and means connecting said roller mechanism with the rear axle to permit a drive from said rear axle to be transmitted to said roller mechanism.

3. The combination with a motor vehicle and the front and rear axles thereof, of a sub-frame secured beneath the vehicle between the front and rear axles, rollers supported on said sub-frame to the front of said rear axle, a mowing device supported on said sub-frame to the rear of said front axle, means for driving said rollers from said rear axle, and means for driving said mowing device from said rollers.

4. The combination with a motor car having the rear wheels detached from the rear axle thereof, of sprocket wheels secured upon said rear axle, of a sub-frame supported beneath the chassis of the motor car, rollers journaled in said sub-frame between the front and rear axles adapted to support the rear portion of said motor car, and driving means connected between said rollers and said sprocket wheels.

5. The combination with a pleasure automobile, of rollers supported thereon between the front and rear axles, said rollers serving to support the rear portion of said automobiles, a mowing mechanism also mounted on said automobile, driving means connecting said rollers and said mowing mechanism, and means connecting said rollers to the rear axle of the automobile to receive a drive therefrom.

6. The combination with a motor car, of a mowing mechanism mounted beneath the car between the front and rear axles thereof, and means for driving the mowing mechanism from the rear axle of the car.

7. The combination with a motor car, of a mowing attachment and a roller mechanism, a sub-frame mounted on the car for supporting said mowing attachment and said roller mechanism, and mechanisms connected with the rear axle of the car for driving said roller mechanism and said mowing attachment.

In testimony whereof I have hereunto subscribed my name in the presence of two subscribing witnesses.

ALBERT E. COOK.

Witnesses:
CHARLES W. HILLS, Jr.,
EARL M. HARDINE.